(12) United States Patent
Ikeno et al.

(10) Patent No.: US 7,699,337 B2
(45) Date of Patent: Apr. 20, 2010

(54) LIQUID SILICONE RUBBER COATING AGENT COMPOSITION AND CURTAIN AIR BAG

(75) Inventors: Masayuki Ikeno, Maebashi (JP); Hidenori Mizushima, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 832 days.

(21) Appl. No.: 11/346,447

(22) Filed: Feb. 3, 2006

(65) Prior Publication Data

US 2006/0177673 A1 Aug. 10, 2006

(30) Foreign Application Priority Data

Feb. 4, 2005 (JP) ............................. 2005-029670

(51) Int. Cl.
*B60R 21/16* (2006.01)
(52) U.S. Cl. .................. 280/728.1; 528/12; 528/15; 528/31; 528/32; 528/33; 528/35; 524/588; 524/858; 524/860; 524/861; 524/862
(58) Field of Classification Search ............ 524/861, 524/588, 858, 860, 862; 528/12, 15, 31–33; 280/728.1
See application file for complete search history.

(56) References Cited

U.S. PATENT DOCUMENTS

| | | | | |
|---|---|---|---|---|
| 4,007,047 | A * | 2/1977 | Kaplan et al. ............... | 430/324 |
| 5,536,803 | A * | 7/1996 | Fujiki et al. ................ | 528/15 |
| 5,877,256 | A | 3/1999 | Nakamura et al. | |
| 6,387,520 | B1 | 5/2002 | Fujiki et al. | |
| 6,780,919 | B2 | 8/2004 | Ikeno et al. | |
| 2002/0111452 | A1 * | 8/2002 | Ikeno et al. ................ | 528/10 |
| 2002/0147276 | A1 * | 10/2002 | Ziebell ...................... | 525/100 |
| 2003/0211340 | A1 * | 11/2003 | Ikeno et al. ................ | 428/447 |

FOREIGN PATENT DOCUMENTS

| | | |
|---|---|---|
| EP | 1215248 | 6/2002 |
| EP | 1627899 | 2/2006 |
| EP | 1 630 202 | 3/2006 |
| JP | 2001-287610 | 10/2001 |
| JP | 2002-138249 | 5/2002 |

OTHER PUBLICATIONS

U.S. Appl. No. 12/044,446, filed Mar. 7, 2008, Ikeno, et al.
U.S. Appl. No. 11/742,910, filed May 1, 2007, Ikeno, et al.
U.S. Appl. No. 11/758,436, Jun. 5, 2007, Mizushima, et al.
U.S. Appl. No. 12/181,682, filed Jul. 29, 2008, Ikeno, et al.

* cited by examiner

*Primary Examiner*—Randy Gulakowski
*Assistant Examiner*—Olatunde S Ojurongbe
(74) *Attorney, Agent, or Firm*—Oblon, Spivak, McClelland, Maier & Neustadt, L.L.P.

(57) ABSTRACT

Provided is a liquid silicone rubber coating agent composition, including: (A) an organopolysiloxane containing at least one alkenyl group bonded to a silicon atom within each molecule, (B) a straight-chain organohydrogenpolysiloxane containing a single silicon atom-bonded hydrogen atom only at each molecular chain terminal, with a viscosity at 25° C. within a range from 0.001 to 1.0 Pa·s, (C) an organohydrogenpolysiloxane containing at least three silicon atom-bonded hydrogen atoms within each molecule, with a viscosity at 25° C. within a range from 0.001 to 10 Pa·s, (D) an addition reaction catalyst, (E) a finely powdered silica with a BET specific surface area of at least 50 m²/g, and (F) an adhesion imparting agent. Also provided is a curtain air bag with a rubber coating layer formed by curing this composition. The coating agent composition is useful for a curtain air bag that is capable of suppressing leakage of the inflator gas and exhibits excellent sustainability of the inflation period, and is also useful in the production of such an air bag.

13 Claims, No Drawings

LIQUID SILICONE RUBBER COATING AGENT COMPOSITION AND CURTAIN AIR BAG

BACKGROUND OF THE INVENTION

1. Field of the Invention

The present invention relates to a liquid silicone rubber coating agent composition that is particularly useful for the fabric for an air bag such as a curtain air bag that contains a silicone rubber coating film formed on a fibrous fabric such as 6,6-nylon, and also relates to a curtain air bag that uses such a composition.

2. Description of the Prior Art

Conventionally, the types of air bag silicone rubber compositions described below have been proposed for forming a rubber coating on a fibrous surface. Specifically, a liquid silicone rubber composition for an air bag with excellent adhesion to base fabrics, prepared by adding an inorganic filler, a siloxane resin, and an epoxy group-containing silicon compound to an addition curable composition (patent reference 1); a liquid silicone rubber coating agent composition that develops excellent adhesion to base fabrics upon heating for a short period at a low temperature, prepared by adding an inorganic filler, a siloxane resin, an organotitanium compound, and an alkyl silicate to an addition curable composition (patent reference 2); a silicone rubber composition for an air bag with excellent thin-film coating characteristics, in which the viscosity of a vinyl group-containing organopolysiloxane is restricted (patent reference 3); and a coating composition for a rubber-coated fabric with reduced tackiness, prepared by adding a wet silica with an average BET specific surface area within a range from 150 to 250 $m^2$/g and an average particle size of no more than 20 μm to a rubber coating composition (patent reference 4) have been proposed.

However, when these compositions are used in the preparation of a curtain air bag, which unlike the air bags installed for the driver's seat and passenger seat, are provided along the edge of the roof from the front pillar, and must be capable of maintaining an inflated state for a certain period of time in order to protect the region around the head and prevent people being flung from the car during a collision or rollover of the vehicle, none of the compositions is able to satisfactorily suppress leakage of the inflator gas, enabling the inflation time to be sustained for a satisfactory period.

[Patent Reference 1] U.S. Pat. No. 5,877,256
[Patent Reference 2] JP 2002-138249A
[Patent Reference 3] JP 2001-287610A
[Patent Reference 4] U.S. Pat. No. 6,387,520

SUMMARY OF THE INVENTION

The present invention takes the above circumstances into consideration, with an object of providing a liquid silicone rubber coating agent composition that is useful for a curtain air bag that is capable of suppressing leakage of the inflator gas and exhibits excellent sustainability of the inflation period, and is also useful in the production of such an air bag.

As a result of intensive investigation aimed at achieving the above object, the inventors of the present invention completed the present invention.

In other words, a first aspect of the present invention provides a liquid silicone rubber coating agent composition, comprising:

(A) 100 parts by mass of an organopolysiloxane containing an average of at least one alkenyl group bonded to a silicon atom within each molecule, (B) a straight-chain organohydrogenpolysiloxane containing a single hydrogen atom bonded to a silicon atom only at each molecular chain terminal, containing no aliphatic unsaturated bonds within the molecule, and with a viscosity at 25° C. within a range from 0.001 to 1.0 Pa·s, (C) an organohydrogenpolysiloxane containing at least three hydrogen atoms bonded to silicon atoms within each molecule, at least one of which exists as a siloxane unit represented by a formula $R^5HSiO_{2/2}$ (wherein, $R^5$ represents an unsubstituted or substituted monovalent hydrocarbon group that contains no aliphatic unsaturated bonds), and with a viscosity at 25° C. within a range from 0.001 to 10 Pa·s [wherein, the blend quantities of the component (B) and the component (C) are set such that the total number of hydrogen atoms bonded to silicon atoms within the combination of the component (B) and the component (C) is within a range from 1 to 7 atoms for each alkenyl group bonded to a silicon atom within the component (A), and the number of hydrogen atoms bonded to silicon atoms within the component (B) represents from 25 to 70% of the total number of hydrogen atoms bonded to silicon atoms within the combination of the component (B) and the component (C)], (D) an effective quantity of an addition reaction catalyst, (E) no more than 50 parts by mass of a finely powdered silica with a specific surface area determined by a BET method of at least 50 $m^2$/g, and (F) 0.05 to 5 parts by mass of an adhesion imparting agent.

A second aspect of the present invention provides a curtain air bag with a rubber coating layer formed by curing the above liquid silicone rubber coating agent composition.

An air bag, and particularly a curtain air bag that uses a liquid silicone rubber coating agent composition of the present invention is capable of suppressing leakage of the inflator gas, and exhibits excellent sustainability of the inflation period. Furthermore, this liquid silicone rubber coating agent composition yields a cured product on curing that exhibits favorable physical properties such as hardness, elongation at rupture, and tear strength.

DETAILED DESCRIPTION OF THE PREFERRED EMBODIMENTS

<Liquid Silicone Rubber Coating Agent Composition>

A liquid silicone rubber coating agent composition of the present invention comprises the components (A) through (F) described below, and is a liquid at room temperature (25° C.). As follows is a detailed description of each of these components.

-(A) Organopolysiloxane-

The organopolysiloxane of the component (A) is the principal component of the composition, and contains an average of at least one, and preferably an average of at least two, and even more preferably no more than an average of 20, and most preferably no more than an average of 10, alkenyl groups bonded to silicon atoms within each molecule.

These alkenyl groups bonded to silicon atoms typically contain from 2 to 8, and preferably from 2 to 4, carbon atoms. Specific examples include vinyl groups, allyl groups, propenyl groups, butenyl groups, pentenyl groups, hexenyl groups, cyclohexenyl groups, and heptenyl groups, although vinyl groups are preferred. The bonding positions within the organopolysiloxane molecule (A) of these alkenyl groups bonded to silicon atoms may be the molecular chain terminals, non-terminal positions within the molecular chain (namely, side chains of the molecular chain other than the molecular chain terminals), or both of these positions.

Examples of the organic groups bonded to silicon atoms other than the above alkenyl groups bonded to silicon atoms include unsubstituted or substituted (for example, halogen-substituted) monovalent hydrocarbon groups that contain no aliphatic unsaturated bonds, and typically contain from 1 to 12, and preferably from 1 to 10, carbon atoms. Specific examples of these groups include alkyl groups such as methyl groups, ethyl groups, propyl groups, isopropyl groups, isobutyl groups, tert-butyl groups, butyl groups, pentyl groups, hexyl groups, and heptyl groups; cycloalkyl groups such as cyclopentyl groups and cyclohexyl groups; aryl groups such as phenyl groups, tolyl groups, xylyl groups, and naphthyl groups; aralkyl groups such as benzyl groups and phenethyl groups; and groups in which the hydrogen atoms within these functional groups have been substituted with a halogen atom such as a chlorine atom or fluorine atom, including halogenated alkyl groups such as chloromethyl groups, 3-chloropropyl groups, and 3,3,3-trifluoropropyl groups, although of these, methyl groups and phenyl groups are preferred.

In the component (A), the quantity of alkenyl groups bonded to silicon atoms, relative to the total number of organic groups bonded to silicon atoms, is typically within a range from 0.001 to 10 mol %, and preferably from 0.01 to 5 mol %.

There are no particular restrictions on the molecular structure of the organopolysiloxane of the component (A), and suitable structures include straight-chain, cyclic, and branched-chain structures, although a straight-chain diorganopolysiloxane in which the principal chain comprises essentially repeating $R^1_2SiO_{2/2}$ units (wherein, each $R^1$ represents, independently, an unsubstituted or substituted monovalent hydrocarbon group) and both molecular chain terminals are blocked with $R^1_3SiO_{1/2}$ units (wherein, $R^1$ is as defined above) (triorganosiloxy units) is preferred. Here, the expression "the principal chain comprises essentially repeating $R^1_2SiO_{2/2}$ units" means that typically 99 to 100 mol %, and preferably from 99.5 to 100 mol %, of the siloxane units that constitute the principal chain portion, excluding the two molecular chain terminals, are $R^1_2SiO_{2/2}$ units.

In the above formulas, the unsubstituted or substituted monovalent hydrocarbon groups represented by $R^1$ typically contain from 1 to 12, and preferably from 1 to 10, carbon atoms. Specific examples of these groups include those groups listed above as specific examples of the alkenyl groups bonded to silicon atoms, and those groups listed above as specific examples of the organic groups bonded to silicon atoms other than the alkenyl groups bonded to silicon atoms.

The viscosity at 25° C. for the organopolysiloxane of the component (A) is preferably within a range from 100 to 500,000 mPa·s, and even more preferably from 300 to 100,000 mPa·s, as such values result in superior physical properties for the resulting cured product such as hardness, elongation at rupture, and tear strength, as well as superior handling and workability for the composition.

The organopolysiloxane of the component (A) is preferably a material represented by an average composition formula (1) shown below:

$$R^2_a R^3_b SiO_{(4-a-b)/2} \quad (1)$$

(wherein, each $R^2$ represents, independently, an unsubstituted or substituted monovalent hydrocarbon group that contains no aliphatic unsaturated bonds, each $R^3$ represents, independently, an alkenyl group, a represents a number from 1.8 to 2.2, and preferably from 1.9 to 2.0, b represents a number from 0.0001 to 0.2, and preferably from 0.001 to 0.1, and a+b represents a number within a range from 1.85 to 2.3, and preferably from 1.95 to 2.05).

In the average composition formula (1) shown above, the unsubstituted or substituted monovalent hydrocarbon group that contains no aliphatic unsaturated bonds represented by $R^2$ typically contains from 1 to 12, and preferably from 1 to 10, carbon atoms. Specific examples include those groups listed above as examples of the organic groups bonded to silicon atoms other than the alkenyl groups bonded to silicon atoms.

In the average composition formula (1) shown above, the alkenyl group represented by $R^3$ typically contains from 2 to 8, and preferably from 2 to 4, carbon atoms. Specific examples include those groups listed above as examples of the alkenyl groups bonded to silicon atoms.

Specific examples of the organopolysiloxane of the component (A) include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane and methylphenylsiloxane with both molecular chain terminals blocked with dimethylvinylsiloxy groups, dimethylpolysiloxane with both molecular chain terminals blocked with divinylmethylsiloxy groups, copolymers of dimethylsiloxane and methylvinylsiloxane with both molecular chain terminals blocked with divinylmethylsiloxy groups, dimethylpolysiloxane with both molecular chain terminals blocked with trivinylsiloxy groups, copolymers of dimethylsiloxane and methylvinylsiloxane with both molecular chain terminals blocked with trivinylsiloxy groups, organosiloxane copolymers comprising siloxane units represented by the formula $R^2_3SiO_{0.5}$ (wherein, $R^2$ is as defined above), siloxane units represented by the formula $R^2_2R^3SiO_{0.5}$ (wherein, $R^3$ is as defined above), siloxane units represented by the formula $R^2_2SiO$, and siloxane units represented by the formula $SiO_2$, organosiloxane copolymers comprising siloxane units represented by the formula $R^2_3SiO_{0.5}$, siloxane units represented by the formula $R^2_2R^3SiO_{0.5}$, and siloxane units represented by the formula $SiO_2$, organosiloxane copolymers comprising siloxane units represented by the formula $R^2_2R^3SiO_{0.5}$, siloxane units represented by the formula $R^2_2SiO$, and siloxane units represented by the formula $SiO_2$, and organosiloxane copolymers comprising siloxane units represented by the formula $R^2R^3SiO$, and siloxane units represented by the formula $R^2SiO_{1.5}$ or siloxane units represented by the formula $R^3SiO_{1.5}$.

The organopolysiloxane of the component (A) may use either a single material, or a combination of two or more different materials.

-(B) Organohydrogenpolysiloxane-

The organohydrogenpolysiloxane of the component (B) increases the molecular chain length of the aforementioned component (A) during curing of the produced composition, and contributes significantly to improvements in the sustainability of the inflation period for the air bag. This organohydrogenpolysiloxane has a straight-chain structure containing a single hydrogen atom bonded to a silicon atom (that is, a SiH group) only at each of the molecular chain terminals, and has a viscosity at 25° C. within a range from 0.001 to 1.0 Pa·s, and preferably from 0.01 to 0.1 Pa·s. This organohydrogenpolysiloxane contains no aliphatic unsaturated bonds within the molecule.

The molecular structure of this straight-chain organohydrogenpolysiloxane should be essentially a straight-chain structure. Here the term "essentially straight-chain" means that typically 99 to 100 mol %, and preferably from 99.5 to 100 mol %, of the siloxane units that constitute the principal chain portion, excluding the two molecular chain terminals, are $R^4_2SiO_{2/2}$ units (wherein, each $R^4$ represents, independently, an unsubstituted or substituted monovalent hydrocarbon group that contains no aliphatic unsaturated bonds). The molecular chain terminals are preferably blocked with diorganohydrogensiloxy groups represented by the formula $R^4_2(H)SiO_{1/2}$.

In the above formulas, the unsubstituted or substituted monovalent hydrocarbon group that contains no aliphatic unsaturated bonds represented by $R^4$ typically contains from 1 to 10, and preferably from 1 to 8, carbon atoms. Specific examples include those groups listed above as examples of the organic groups bonded to silicon atoms other than the alkenyl groups bonded to silicon atoms within the component (A).

The organohydrogenpolysiloxane of the component (B) is preferably a material represented by a general formula (2) shown below:

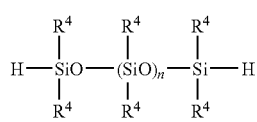

(2)

(wherein, $R^4$ is as defined above, and n represents an integer that results in a viscosity at 25° C. for the organohydrogenpolysiloxane within a range from 0.001 to 1.0 Pa·s, and preferably from 0.01 to 0.1 Pa·s).

The blend quantity of the organohydrogenpolysiloxane of the component (B) is as described below within the section relating to the component (C). The organohydrogenpolysiloxane of the component (B) may use either a single material, or a combination of two or more different materials.

-(C) Organohydrogenpolysiloxane-

The organohydrogenpolysiloxane of the component (C) contains at least three, and preferably from 3 to 200, and even more preferably from 3 to 100, hydrogen atoms bonded to silicon atoms (that is, SiH groups) within each molecule, wherein at least one of these SiH groups, and preferably from 20 to 100%, and even more preferably from 30 to 100% (of the actual number) of these SiH groups exist as organohydrogensiloxane units represented by a formula $R^5HSiO_{2/2}$ (wherein, $R^5$ represents an unsubstituted or substituted monovalent hydrocarbon group that contains no aliphatic unsaturated bonds), and has a viscosity at 25° C. within a range from 0.001 to 10 Pa·s, and preferably from 0.01 to 5 Pa·s. This organohydrogenpolysiloxane contains no aliphatic unsaturated bonds within the molecule.

There are no particular restrictions on the molecular structure of the organohydrogenpolysiloxane of the component (C), and straight-chain, cyclic, branched-chain, or three dimensional network type structures are all suitable, although an essentially straight-chain structure is preferred. Furthermore, cyclic siloxanes may be bonded to the molecular chain terminals. Here the term "essentially straight-chain" means that typically 99 to 100 mol %, and preferably from 99.5 to 100 mol %, of the siloxane units that constitute the principal chain portion, excluding the two molecular chain terminals (or the cyclic siloxanes in those cases where such cyclic siloxanes are bonded to the terminals), are $R^6_2SiO_{2/2}$ units (wherein, each $R^6$ represents, independently, a hydrogen atom or a $R^5$ group).

The hydrogen atoms bonded to silicon atoms may be positioned at the molecular chain terminals of the organohydrogenpolysiloxane molecule (C), at non-terminal positions within the molecular chain, or at both of these positions. Furthermore, in those cases where a cyclic siloxane is bonded at a molecular chain terminal, the hydrogen atoms may also be positioned within this cyclic siloxane. The number of silicon atoms within the organohydrogenpolysiloxane molecule of this component (C) is typically from 3 to 200, and preferably from 4 to 100.

In the above formula, the unsubstituted or substituted monovalent hydrocarbon group that contains no aliphatic unsaturated bonds represented by $R^5$ typically contains from 1 to 10, and preferably from 1 to 8, carbon atoms. Specific examples include those groups listed above as examples of the organic groups bonded to silicon atoms other than the alkenyl groups bonded to silicon atoms within the component (A).

The organohydrogenpolysiloxane of the component (C) is preferably a material represented by the average composition formula (3) shown below:

$$R^5_e H_f SiO_{(4-e-f)/2} \quad (3)$$

(wherein, $R^5$ is as defined above, e represents a number from 0.7 to 2.1, f represents a number from 0.001 to 1.0, and e+f represents a number from 0.8 to 2.7, although preferably, e represents a number from 1.0 to 2.0, f represents a number from 0.01 to 1.0, and e+f represents a number from 1.1 to 2.5).

Examples of such materials include polymers containing $R^5HSiO_{2/2}$ units (wherein, $R^5$ is as defined above) within the molecule, and optionally containing $R^5_2R^6SiO_{1/2}$ units (wherein, $R^6$ is as defined above) and/or $R^5_2SiO_{2/2}$ units.

Specific examples of the organohydrogenpolysiloxane of the component (C) include 1,3,5,7-tetramethylcyclotetrasiloxane, methylhydrogencyclopolysiloxane, cyclic copolymers of methylhydrogensiloxane and dimethylsiloxane, methylhydrogenpolysiloxane with both molecular chain terminals blocked with trimethylsiloxy groups, copolymers of dimethylsiloxane and methylhydrogensiloxane with both molecular chain terminals blocked with trimethylsiloxy groups, copolymers of dimethylsiloxane and methylhydrogensiloxane with both molecular chain terminals blocked with dimethylhydrogensiloxy groups, copolymers of methylhydrogensiloxane and diphenylsiloxane with both molecular chain terminals blocked with trimethylsiloxy groups, copolymers of methylhydrogensiloxane, diphenylsiloxane, and dimethylsiloxane with both molecular chain terminals blocked with trimethylsiloxy groups, copolymers of methylhydrogensiloxane, methylphenylsiloxane, and dimethylsiloxane with both molecular chain terminals blocked with trimethylsiloxy groups, copolymers of methylhydrogensiloxane, dimethylsiloxane, and diphenylsiloxane with both molecular chain terminals blocked with dimethylhydrogensiloxy groups, copolymers of methylhydrogensiloxane, dimethylsiloxane, and methylphenylsiloxane with both molecular chain terminals blocked with dimethylhydrogensiloxy groups, copolymers comprising $(CH_3)(H)SiO_{2/2}$ units, $(CH_3)_3SiO_{1/2}$ units, and $SiO_{4/2}$ units, copolymers comprising $(CH_3)(H)SiO_{2/2}$ units, $(CH_3)_2SiO_{2/2}$ units, $(CH_3)_3SiO_{1/2}$ units, and $SiO_{4/2}$ units, copolymers comprising $(CH_3)(H)SiO_{2/2}$ units, $(CH_3)_2(H)SiO_{1/2}$ units, $(CH_3)_3SiO_{1/2}$ units, and $SiO_{4/2}$ units, and copolymers comprising $(CH_3)(H)SiO_{2/2}$ units, $(CH_3)_2(H)SiO_{1/2}$ units, $(CH_3)_2SiO_{2/2}$ units, $(CH_3)_3SiO_{1/2}$ units, and $SiO_{4/2}$ units, and, in addition to these, more preferably include those shown below.

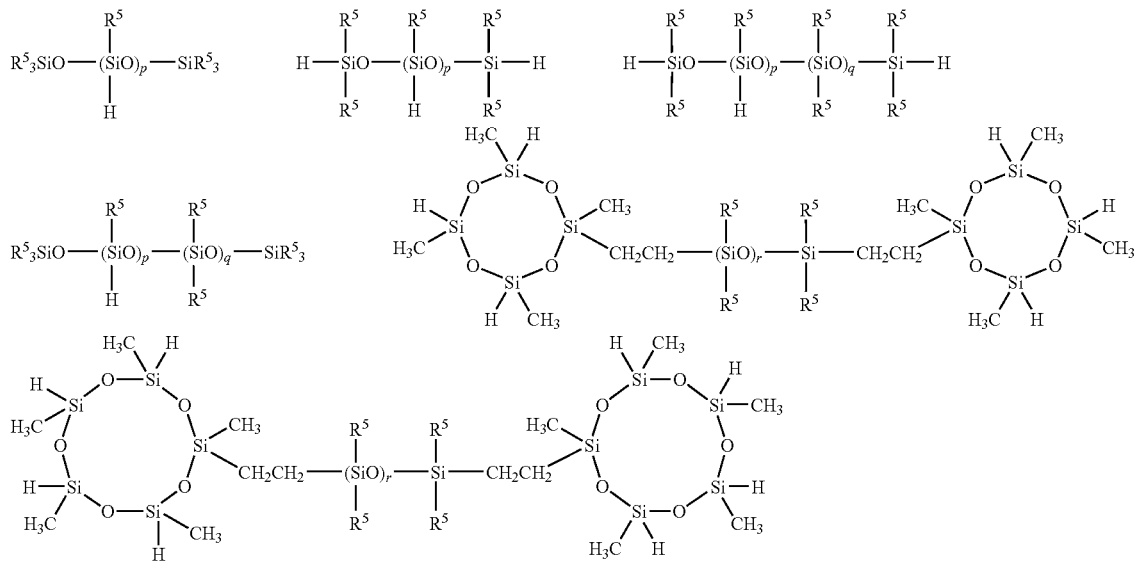

(wherein, $R^5$ is as defined above, and p, q, and r each represent, independently, an integer of 1 or greater, although p, q, and r must be integers which generate a viscosity at 25° C. for the organohydrogenpolysiloxane that falls within a range from 0.001 to 10 Pa·s, and preferably from 0.01 to 5 Pa·s)

The blend quantities of the component (B) and the component (C) are set such that the total number of hydrogen atoms bonded to silicon atoms within the combination of the component (B) and the component (C) for each alkenyl group bonded to a silicon atom within the component (A) is within a range from 1 to 7 atoms (that is, a molar ratio of 1 to 7), and preferably from 1 to 5 atoms, and even more preferably from 1 to 3 atoms, and moreover, the number (or the number of mols) of hydrogen atoms bonded to silicon atoms within the component (B) represents from 25 to 70%, and preferably from 30 to 60%, and even more preferably from 30 to 50% of the total number (or total number of mols) of hydrogen atoms bonded to silicon atoms within the combination of the component (B) and the component (C). If these numbers (blend quantities) do not satisfy the above ranges, the air bag exhibits inferior airtightness on inflation.

The organohydrogenpolysiloxane of the component (C) may use either a single material, or a combination of two or more different materials.

-(D) Addition Reaction Catalyst-

The addition reaction catalyst of the component (D) is used to promote the addition reaction between the alkenyl groups bonded to silicon atoms within the component (A) and the SiH groups within the component (B) and the component (C). There are no particular restrictions on this addition reaction catalyst, and suitable examples include platinum-group metals such as platinum, palladium, and rhodium; chloroplatinic acid; alcohol-modified chloroplatinic acid; coordination compounds of chloroplatinic acid with olefins, vinylsiloxane, or acetylene compounds; and platinum-group metal compounds such as tetrakis(triphenylphosphine)palladium and chlorotris(triphenylphosphine)rhodium, although of these, platinum-group metal compounds are preferred.

The blend quantity of the component (D) need only be an effective catalytic quantity, and a preferred quantity, calculated as the mass of the catalytic metal atoms relative to the combined mass of the components (A) through (C), is within a range from 1 to 500 ppm, with quantities from 10 to 100 ppm being particularly desirable. If this blend quantity is too small, the addition reaction slows markedly, meaning the composition may not cure satisfactorily, whereas if the blend quantity is too large, the heat resistance of the cured product may deteriorate.

The addition reaction catalyst of the component (D) may use either a single material, or a combination of two or more different materials.

-(E) Finely Powdered Silica-

The finely powdered silica of the component (E) functions as a reinforcing agent, and imparts a high tear strength to the cured product. Accordingly, by using this component, a coating film with superior tear strength can be formed. This finely powdered silica must have a specific surface area determined by a BET method of at least 50 $m^2/g$, and this value is preferably within a range from 50 to 400 $m^2/g$, and even more preferably from 100 to 300 $m^2/g$. If this specific surface area is less than 50 $m^2/g$, a satisfactory tear strength may not be able to be imparted to the composition.

Provided the specific surface area determined by a BET method falls within the above range, the finely powdered silica of the component (E) can employ known silica materials conventionally used as reinforcing fillers within silicone rubbers. Specific examples include precipitated silica, fumed silica, and calcined silica. These finely powdered silica materials may be used as is, although in order to impart a superior level of flowability to the composition, are preferably used in the form of a hydrophobic finely powdered silica, wherein the surface of the silica has undergone hydrophobic treatment with an organosilicon compound, including a hexaorganodisilazane such as hexamethyldisilazane, divinyltetramethyldisilazane, or dimethyltetravinyldisilazane; an alkoxysilane such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, or divinyldimethoxysilane; a methylchlorosilane such as trimethylchlorosilane, dimethyldichlorosilane, or methyltrichlorosilane; or a dimethylpolysiloxane containing no alkenyl groups bonded to silicon atoms and no hydrogen atoms bonded to silicon atoms.

The blend quantity of the component (E) used in the present invention must be no more than 50 parts by mass per 100 parts by mass of the organopolysiloxane of the component (A), and is preferably within a range from 1 to 50 parts by mass, and even more preferably from 5 to 40 parts by mass. If this blend quantity is too small, then a superior level of tear strength may be unobtainable. If the blend quantity is too large, then the flowability of the composition may deteriorate, causing a worsening of the coating workability.

The finely powdered silica of the component (E) may use either a single material, or a combination of two or more different materials.

(F) Adhesion Imparting Agent

The adhesion imparting agent of the component (F) is a component for improving the adhesion of the composition to the synthetic-fiber woven base materials, non-woven base materials, or sheets or films of thermoplastic resins used in air bags. There are no particular restrictions on this adhesion imparting agent, provided it is capable of improving the self-adhesiveness of the composition. Examples of suitable materials include organosilicon compound-based adhesion imparting agents and non-silicon-containing organic compound-based adhesion imparting agents. Specific examples of suitable organosilicon compound-based adhesion imparting agents include adhesion imparting agents comprising organosilicon compounds such as organosilanes or organopolysiloxanes that are different from the aforementioned components (A) through (C), whereas specific examples of suitable non-silicon-containing organic compound-based adhesion imparting agents include adhesion imparting agents comprising allyl esters of organic acids, epoxy ring-opening catalysts, or organotitanium compounds. These adhesion imparting agents can be used either alone, or in combinations of two or more different compounds.

The allyl esters of organic acids must contain no silicon atoms within the molecule, and examples include allyl esters of organic acids that contain one alkenyl group and at least one ester group within each molecule. Suitable organic acids include unsaturated carboxylic acids such as acrylic acid, methacrylic acid, and vinylacetic acid; aromatic carboxylic acids such as benzoic acid, phthalic acid, and pyromellitic acid; and saturated fatty acids such as acetic acid, propionic acid, butyric acid, and lauric acid. Specific examples of organic acid allyl esters comprising these organic acids include the allyl esters of unsaturated carboxylic acids such as acrylic acid, methacrylic acid, and vinylacetic acid; the allyl esters of aromatic carboxylic acids, such as allyl benzoate, diallyl phthalate, and tetraallyl pyromellitate; and allyl esters of saturated fatty acids, such as allyl acetate, allyl propionate, allyl butyrate, allyl valerate, and allyl laurate.

The epoxy ring-opening catalysts must contain no silicon atoms within the molecule, and suitable examples include organometal chelates, as well as amine-based, amide-based, imidazole-based, and acid anhydride-based epoxy ring-opening catalysts.

The organotitanium compounds must contain no silicon atoms within the molecule, and specific examples of suitable compounds include tetrabutoxytitanium, tetrakis(2-ethylhexyloxy)titanium, tetrastearyloxytitanium, titanium stearate, tetraoctyloxytitanium, titanium isopropoxyoctylene glycolate, triethanolamine titanate, titanium acetylacetonate, titanium ethylacetonate, titanium lactonate, and oligomers and polymers generated as condensation reaction products of the above compounds.

Examples of suitable organosilicon compounds include organosilanes, straight-chain or cyclic siloxane oligomers other than the aforementioned components (A) through (C) comprising from 3 to 100, and preferably from 3 to 50, and most preferably from 5 to 20, silicon atoms, (alkoxy)silyl-modified products of triallyl isocyanurate, and siloxane derivatives thereof, all of which contain at least one, and preferably two or more, functional groups bonded to silicon atoms and selected from the group consisting of alkenyl groups such as a vinyl group and allyl group; epoxy groups that are bonded to a silicon atom via carbon atom(s) within, for example, an alkylene group that may contain at least one ether linkage oxygen atom, such as a γ-glycidoxypropyl group and β-(3,4-epoxycyclohexyl)ethyl group; acryloxy groups and methacryloxy groups that are bonded to a silicon atom via carbon atom(s) within, for example, an alkylene group, such as a γ-acryloxypropyl group and γ-methacryloxypropyl group; alkoxyl groups such as a methoxy group, ethoxy group, propoxy group and butoxy group; alkoxysilyl groups such as a trimethoxsilyl group, triethoxysilyl group and methyldimethoxysilyl group that are bonded to a silicon atom via a carbon atom such as an alkylene group and may also contain 1 or 2 ester structures, urethane structures, or ether structures; isocyanate groups; and a SiH group, and of these, compounds containing two or more of the above functional groups within each molecule are preferred.

Specific examples of this type of organosilicon compound include the compounds shown below.

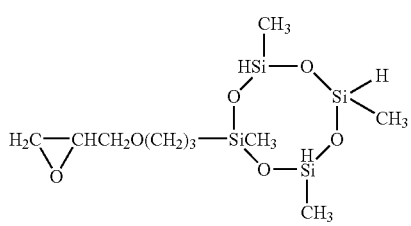 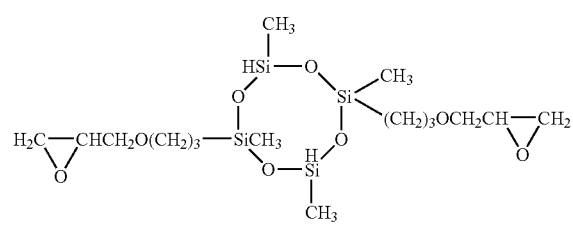

-continued

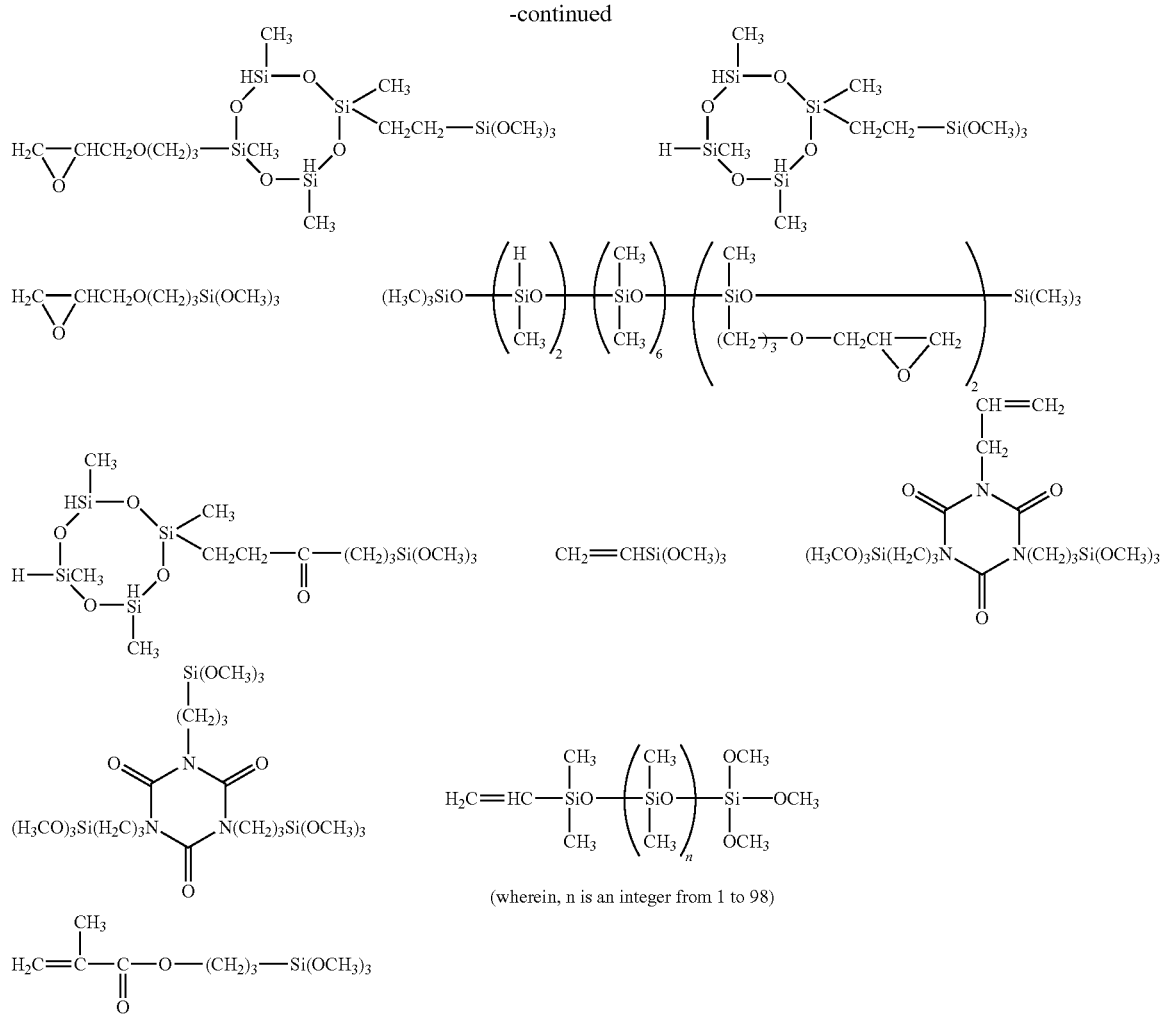

(wherein, n is an integer from 1 to 98)

The blend quantity of the component (F) must fall within a range from 0.05 to 5 parts by mass per 100 parts by mass of the organopolysiloxane of the component (A), and is preferably within a range from 0.1 to 2 parts by mass. If this blend quantity is too small, then the resulting composition may not exhibit satisfactory adhesiveness, whereas if the blend quantity is too large, then the increased costs make the composition uneconomic.

The adhesion imparting agent of the component (F) may use either a single material, or a combination of two or more different materials.

-Other Components-

In addition to the components (A) through (F) described above, other optional components can also be added to the composition of the present invention, provided such addition does not impair the effects of the present invention. Specific examples of these other components include those described below. These other components can be used either alone, or in combinations of two or more different materials.

-Reaction Retarders

A reaction retarder may be any compound that exhibits a suppression effect on the curing reaction promoted by the addition reaction catalyst of the aforementioned component (D), and conventional reaction retarders can be used. Specific examples of suitable retarders include phosphorus-containing compounds such as triphenylphosphine; nitrogen atom-containing compounds such as tributylamine, tetramethylethylenediamine, and benzotriazole; sulfur atom-containing compounds; acetylene-based compounds such as acetylene alcohols; compounds that contain two or more alkenyl groups; hydroperoxy compounds; and maleic acid derivatives.

The effect of the reaction retarder in suppressing the curing reaction varies depending on its chemical structure, and consequently the blend quantity of the reaction retarder is preferably adjusted to the most appropriate quantity for the particular reaction retarder being used. By using the most appropriate quantity of the reaction retarder, a composition with superior levels of room temperature storage stability and curability can be obtained.

-Inorganic Fillers

Examples of suitable inorganic fillers include fillers such as crystalline silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; the above types of inorganic fillers that have undergone hydrophobic surface treatment with an organosilicon compound such as an organoalkoxysilane compound, organochlorosilane compound, organosilazane compound, or low molecular weight siloxane compound; silicone rubber powders; and silicone resin powders.

-Other components

Examples of other components include, for example, organopolysiloxanes containing one hydrogen atom bonded to a silicon atom, but containing no other functional groups (such as the functional groups listed above for the organosilicon-based compounds), organopolysiloxanes containing no hydrogen atoms bonded to silicon atoms, nor alkenyl groups bonded to silicon atoms; solvents such as water or organic solvents; as well as creep hardening prevention agents, plasticizers, thixotropic imparting agents, pigments, dyes, and moldproofing agents.

-Preparation Conditions-

The curing method and curing conditions for a composition of the present invention can employ conventional curing methods and curing conditions, with the curing conditions typically including heating at 120 to 180° C. for a period of 1 to 10 minutes.

<Air Bags>

A composition of the present invention is preferably used within an air bag, and particularly a curtain air bag. Examples of air bags with a silicone rubber coating layer comprising a cured product of a composition of the present invention include air bags of conventional construction, and suitable examples include woven air bags comprising such a silicone rubber coating layer. Specific examples of such air bags include woven air bags using a woven fabric base material formed from a synthetic fiber such as 6,6-Nylon, 6-Nylon, polyester fiber, aramid fiber, any of the various polyamide fibers, and any of the various polyester fibers.

There are no particular restrictions on the method used for coating the composition onto the base fabric during production of these types of air bags, and conventional methods can be employed. The thickness of the coating layer (or the quantity of composition applied to the surface) is preferably equivalent to a dry quantity within a range from 10 to 150 g/m$^2$, and even more preferably from 15 to 80 g/m$^2$, and most preferably from 20 to 60 g/m$^2$.

EXAMPLES

As follows is a description of specifics of the present invention using a series of examples, although the present invention is in no way restricted to the examples presented below. The units "parts" refer to "parts by mass", and viscosity values represent values at 25° C.

Reference Example 1

60 parts of a dimethylpolysiloxane with a viscosity of approximately 30,000 mPa·s and with both molecular chain terminals blocked with vinyldimethylsiloxy groups, 8 parts of hexamethyldisiloxane, 2 parts of water, and 40 parts of a finely powdered silica with a specific surface area determined by a BET method of approximately 300 m$^2$/g (product name: Aerosil 300, manufactured by Nippon Aerosil Co., Ltd.) were mixed together for one hour in a kneader. Subsequently, the temperature inside the kneader was raised to 150° C., and mixing was continued for a further two hours. Following subsequent cooling of the temperature to 100° C., 30 parts of the dimethylpolysiloxane with a viscosity of approximately 30,000 mPa·s and with both molecular chain terminals blocked with vinyldimethylsiloxy groups was added, and stirring was continued until a uniform mixture was obtained, thus yielding a base compound (I).

To 68 parts of this base compound (I) were added and mixed 23 parts of a dimethylpolysiloxane with a viscosity of approximately 5,000 mPa·s and with both molecular chain terminals blocked with vinyldimethylsiloxy groups, 23 parts of a dimethylpolysiloxane with a viscosity of approximately 1,000 mPa·s and with both molecular chain terminals blocked with vinyldimethylsiloxy groups, 5 parts of a three dimensional network-type organopolysiloxane resin comprising 39.5 mol % of $(CH_3)_3SiO_{1/2}$ units, 6.5 mol % of $(CH_3)_2(CH_2=CH)SiO_{1/2}$ units and 54 mol % of $SiO_2$ units, 3 parts of a dimethylpolysiloxane, in which the principal chain diorganosiloxane units comprise 5 mol % of vinylmethylsiloxane units and 95 mol % of dimethylsiloxane units, with a viscosity of approximately 700 mPa·s, and with both molecular chain terminals blocked with trimethylsiloxy groups, 4.1 parts of a dimethylpolysiloxane with a viscosity of 18 mPa·s and with one silicon atom-bonded hydrogen atom in the form of a dimethylhydrogensiloxy group at each of the molecular chain terminals (quantity of hydrogen atoms bonded to silicon atoms=0.13% by mass), 4.1 parts of a copolymer of dimethylsiloxane and methylhydrogensiloxane, with a viscosity of 10 mPa·s, with hydrogen atoms bonded to silicon atoms at both molecular chain terminals and at non-terminal positions within the molecular chain, and with both molecular chain terminals blocked with dimethylhydrogensiloxy groups (quantity of hydrogen atoms bonded to silicon atoms=0.31% by mass), 0.09 parts of 1-ethynylcyclohexanol, 0.25 parts of a dimethylpolysiloxane solution of a complex of chloroplatinic acid and 1,3-divinyltetramethyldisiloxane comprising a platinum atom content of 1% by mass, 0.28 parts of γ-glycidoxypropyltrimethoxysilane, and 0.17 parts of octyl titanate, thus completing preparation of a composition 1.

In the composition 1, the total number of hydrogen atoms bonded to silicon atoms within the combination of the aforementioned component (B) and component (C) was 1.6 for each alkenyl group bonded to a silicon atom within the aforementioned component (A), and the number of hydrogen atoms bonded to silicon atoms within the component (B) represented 30% of the total number of hydrogen atoms bonded to silicon atoms within the combination of the component (B) and the component (C).

This composition 1 was cured by heating at 150° C. for 5 minutes, a test sheet was prepared in accordance with JIS K 6249, and this test sheet was used to conduct measurements of the hardness, elongation at rupture, and tear strength.

Furthermore, this composition was coated onto a woven air bag base fabric using a coater, using the minimum quantity capable of forming a uniform coating with no unevenness (80 g/m$^2$), the ease of application was noted, and the coated base fabric was placed in an oven and heated at 170° C. for one minute to cure the coating, thus completing preparation of a woven air bag. This air bag was used for conducting an airtightness test. In this airtightness test, the air bag was inflated with a pressure of 100 kPa, the residual air pressure was measured after 30 seconds, and this value was used to evaluate the airtightness.

The results obtained above, together with the H/V value and the linear cross-linking ratio are shown in Table 1. H/V is the molar ratio of the hydrogen atoms bonded to silicon atoms within the combination of the aforementioned component (B) and component (C) relative to the alkenyl groups bonded to silicon atoms within the component (A). The linear cross-linking ratio is the ratio of the number of hydrogen atoms bonded to silicon atoms within the component (B) relative to the total number of hydrogen atoms bonded to silicon atoms within the combination of the component (B) and the component (C), expressed as a percentage.

Example 2

To 98 parts of the base compound (I) obtained in the reference example 1 were added and mixed 23 parts of a dimethylpolysiloxane with a viscosity of approximately 5,000 mPa·s and with both molecular chain terminals blocked with vinyldimethylsiloxy groups, 4.0 parts of a three dimensional network-type organopolysiloxane resin comprising 39.5 mol % of $(CH_3)_3SiO_{1/2}$ units, 6.5 mol % of $(CH_3)_2(CH_2=CH)SiO_{1/2}$ units and 54 mol % of $SiO_2$ units, 3 parts of a dimethylpolysiloxane, in which the principal chain diorganosiloxane units comprise 5 mol % of vinylmethylsiloxane units and 95 mol % of dimethylsiloxane units, with a viscosity of approximately 700 mPa·s, and with both molecular chain terminals blocked with trimethylsiloxy groups, 6 parts of a dimethylpolysiloxane with a viscosity of 18 mPa·s and with one silicon atom-bonded hydrogen atom in the form of a dimethylhydrogensiloxy group at each of the molecular chain terminals (quantity of hydrogen atoms bonded to silicon atoms=0.13% by mass), 0.56 parts of a copolymer of dimethylsiloxane and methylhydrogensiloxane, with a viscosity of 20 mPa·s, with hydrogen atoms bonded to silicon atoms at non-terminal positions within the molecular chain, and with both molecular chain terminals blocked with trimethylsiloxy groups (quantity of hydrogen atoms bonded to silicon atoms=0.72% by mass), 12 parts of an organohydrogenpolysiloxane compound with a viscosity of 3,000 mPa·s, represented by a structural formula shown below:

$$\text{[structural formula of organohydrogenpolysiloxane with two cyclic siloxane end groups connected by } -CH_2CH_2-(SiO)_{200}-Si-CH_2CH_2- \text{ linker]}$$

(quantity of hydrogen atoms bonded to silicon atoms=0.035% by mass), 0.08 parts of 1-ethynylcyclohexanol, 0.22 parts of a dimethylpolysiloxane solution of a complex of chloroplatinic acid and 1,3-divinyltetramethyldisiloxane comprising a platinum atom content of 1% by mass, 0.2 parts of γ-glycidoxypropyltrimethoxysilane, and 0.13 parts of octyl titanate, thus completing preparation of a composition 2.

In the composition 2, the total number of hydrogen atoms bonded to silicon atoms within the combination of the aforementioned component (B) and component (C) was 2.2 for each alkenyl group bonded to a silicon atom within the aforementioned component (A), and the number of hydrogen atoms bonded to silicon atoms within the component (B) represented 49% of the total number of hydrogen atoms bonded to silicon atoms within the combination of the component (B) and the component (C).

A test sheet and woven air bag were prepared, and measurements were conducted, in the same manner as the reference example 1. The results are shown in Table 1.

Comparative Example 1

To 78 parts of the base compound (I) obtained in the reference example 1 were added and mixed 35 parts of a dimethylpolysiloxane with a viscosity of approximately 5,000 mPa·s and with both molecular chain terminals blocked with vinyldimethylsiloxy groups, 15 parts of a dimethylpolysiloxane with a viscosity of approximately 1,000 mPa·s and with both molecular chain terminals blocked with vinyldimethylsiloxy groups, 5.0 parts of a three dimensional network-type organopolysiloxane resin comprising 39.5 mol % of $(CH_3)_3SiO_{1/2}$ units, 6.5 mol % of $(CH_3)_2(CH_2=CH)SiO_{1/2}$ units and 54 mol % of $SiO_2$ units, 3 parts of a dimethylpolysiloxane, in which the principal chain diorganosiloxane units comprise 5 mol % of vinylmethylsiloxane units and 95 mol % of dimethylsiloxane units, with a viscosity of approximately 700 mPa·s, and with both molecular chain terminals blocked with trimethylsiloxy groups, 10 parts of a copolymer of dimethylsiloxane and methylhydrogensiloxane, with a viscosity of 12 mPa·s, with hydrogen atoms bonded to silicon atoms at both molecular chain terminals and at non-terminal positions within the molecular chain, and with both molecular chain terminals blocked with dimethylhydrogensiloxy groups (quantity of hydrogen atoms bonded to silicon atoms=0.55% by mass), 1.5 parts of a copolymer of dimethylsiloxane and methylhydrogensiloxane, with a viscosity of 50 mPa·s, with hydrogen atoms bonded to silicon atoms at non-terminal positions within the molecular chain, and with both molecular chain terminals blocked with trimethylsiloxy groups (quantity of hydrogen atoms bonded to silicon atoms=1.12% by mass), 0.09 parts of 1-ethynylcyclohexanol, 0.25 parts of a dimethylpolysiloxane solution of a complex of chloroplatinic acid and 1,3-divinyltetramethyldisiloxane comprising a platinum atom content of 1% by mass, 0.3 parts of γ-glycidoxypropyltrimethoxysilane, and 0.17 parts of octyl titanate, thus completing preparation of a composition C1.

In the composition C1, the total number of hydrogen atoms bonded to silicon atoms within the combination of the aforementioned component (B) and component (C) was 6.2 for each alkenyl group bonded to a silicon atom within the aforementioned component (A), and the number of hydrogen atoms bonded to silicon atoms within the component (B) represented 0% of the total number of hydrogen atoms bonded to silicon atoms within the combination of the component (B) and the component (C).

A test sheet and woven air bag were prepared, and measurements were conducted, in the same manner as the reference example 1. The results are shown in Table 1.

Comparative Example 2

To 68 parts of the base compound (I) obtained in the reference example 1 were added and mixed 23 parts of a dimethylpolysiloxane with a viscosity of approximately 5,000 mPa·s and with both molecular chain terminals blocked with vinyldimethylsiloxy groups, 23 parts of a dimethylpolysiloxane with a viscosity of approximately 1,000 mPa·s and with both molecular chain terminals blocked with vinyldimethylsiloxy groups, 5.0 parts of a three dimensional network-type organopolysiloxane resin comprising 39.5 mol % of $(CH_3)_3SiO_{1/2}$ units, 6.5 mol % of $(CH_3)_2(CH_2=CH)SiO_{1/2}$ units and 54 mol % of $SiO_2$ units, 3 parts of a dimethylpolysiloxane, in which the principal chain diorganosiloxane units comprise 5 mol % of vinylmethylsiloxane units and 95 mol % of dimethylsiloxane units, with a viscosity of approximately 700 mPa·s, and with both molecular chain terminals blocked with trimethylsiloxy groups, 2.8 parts of a dimethylpolysiloxane with a viscosity of 18 mPa·s and with one silicon atom-bonded hydrogen atom in the form of a dimethylhydrogensiloxy group at each of the molecular chain terminals (quantity of hydrogen atoms bonded to silicon atoms=0.13% by mass), 4.6 parts of a copolymer of dimethylsiloxane and methylhydrogensiloxane, with a viscosity of 10 mPa·s, with hydrogen atoms bonded to silicon atoms at both molecular chain terminals and at non-terminal positions within the molecular chain, and with both molecular chain terminals blocked with dimethylhydrogensiloxy groups (quantity of hydrogen atoms bonded to silicon atoms=0.31% by mass), 0.09 parts of 1-ethynylcyclohexanol, 0.25 parts of a dimethylpolysiloxane solution of a complex of chloroplatinic acid and 1,3-divinyltetramethyldisiloxane comprising a platinum atom content of 1% by mass, 0.28 parts of γ-glycidoxypropyltrimethoxysilane, and 0.17 parts of octyl titanate, thus completing preparation of a composition C2.

In the composition C2, the total number of hydrogen atoms bonded to silicon atoms within the combination of the aforementioned component (B) and component (C) was 1.5 for each alkenyl group bonded to a silicon atom within the aforementioned component (A), and the number of hydrogen atoms bonded to silicon atoms within the component (B) represented 20% of the total number of hydrogen atoms bonded to silicon atoms within the combination of the component (B) and the component (C).

A test sheet and woven air bag were prepared, and measurements were conducted, in the same manner as the reference example 1. The results are shown in Table 1.

TABLE 1

|  | Reference Example 1 | Example 2 | Comparative example 1 | Comparative example 2 |
|---|---|---|---|---|
| Hardness (durometer type A) | 25 | 17 | 25 | 22 |
| Elongation at rupture (%) | 600 | 860 | 520 | 570 |
| Tear strength (kN/m) | 8 | 22 | 17 | 22 |
| H/V | 1.6 | 2.2 | 6.2 | 1.5 |
| Linear cross-linking ratio (%) | 30 | 49 | 0 | 20 |
| Airtightness (kPa) | 80 | 85 | 20 | 30 |

What is claimed is:

1. A curtain air bag having a rubber coating layer formed by curing a liquid silicone rubber coating agent composition comprising:
   (A) 100 parts by mass of at least one organopolysiloxane comprising an average of at least one alkenyl group bonded to a silicon atom within each molecule;
   (B) at least one straight-chain organohydrogenpolysiloxane comprising a single hydrogen atom bonded to a silicon atom only at each molecular chain terminal, containing no aliphatic unsaturated bonds within a molecule, and with a viscosity at 25° C. within a range from 0.001 to 1.0 Pa·s;
   (C) at least one organohydrogenpolysiloxane selected from the group consisting of a compound represented by formula (V) and a compound represented by formula (VI):

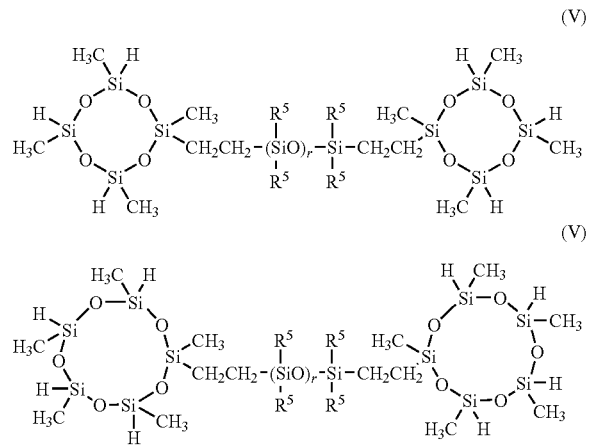

wherein $R^5$ represents an unsubstituted or substituted monovalent hydrocarbon group that contains no aliphatic unsaturated bonds, and r represents an integer of 1 or greater, and with a viscosity at 25° C. within a range from 0.001 to 10 Pa·s and wherein, blend quantities of said component (B) and said component (C) are set such that a total number of hydrogen atoms bonded to silicon atoms within a combination of said component (B) and said component (C) is within a range from 1 to 7 atoms for each alkenyl group bonded to a silicon atom within said component (A), and a number of hydrogen atoms bonded to silicon atoms within said component (B) represents from 25 to 70% of a total number of hydrogen atoms bonded to silicon atoms within a combination of said component (B) and said component (C);
   (D) an effective quantity of at least one addition reaction catalyst;
   (E) no more than 50 parts by mass of at least one finely powdered silica with a specific surface area determined by a BET method of at least 50 m²/g; and
   (F) 0.05 to 5 parts by mass of at least one adhesion imparting agent.

2. The curtain air bag according to claim 1, wherein said component (B) is at least one organohydrogenpolysiloxane represented by formula (2):

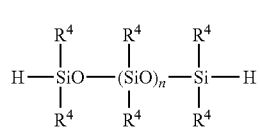

wherein, each $R^4$ represents, independently, an unsubstituted or substituted monovalent hydrocarbon group that contains no aliphatic unsaturated bonds, and n represents an integer that results in a viscosity at 25° C. for the organohydrogenpolysiloxane within a range from 0.001 to 1.0 Pa·s.

3. The curtain air bag according to claim 1, wherein said total number of hydrogen atoms bonded to silicon atoms within a combination of said component (B) and said component (C) is within a range from 1 to 5 atoms for each alkenyl group bonded to a silicon atom within said component (A).

4. The curtain air bag according to claim 1, wherein said number of hydrogen atoms bonded to silicon atoms within said component (B) represents from 30 to 60% of a total number of hydrogen atoms bonded to silicon atoms within a combination of said component (B) and said component (C).

5. The curtain air bag according to claim 1, wherein said adhesion imparting agent (F) is at least one organosilicon compound selected from the group consisting of an organosilane; a siloxane oligomer other than components (A) through (C); a silyl-modified product of triallyl isocyanurate, and a siloxane derivative thereof, containing two or more functional groups bonded to silicon atoms and selected from the group consisting of an alkenyl group, an epoxy group, an acryloxy group, a methacryloxy group, an alkoxyl group, an alkoxysilyl group, an isocyanate group, and a SiH group; and non-silicon-containing organic compounds selected from the group consisting of an allyl ester of an organic acid, an epoxy ring-opening catalyst, and an organotitanium compound.

6. The curtain air bag according to claim 1, wherein said component (A) is an organopolysiloxane represented by average composition formula (1):

wherein,
   each $R^2$ represents, independently, an unsubstituted or substituted monovalent hydrocarbon group that contains no aliphatic unsaturated bonds,
   each $R^3$ represents, independently, an alkenyl group,
   a represents a number from 1.8 to 2.2,
   b represents a number from 0.0001 to 0.2, and
   a+b represents a number within a range from 1.85 to 2.3.

7. The curtain air bag according to claim 1, wherein said component (A) exhibits a viscosity at 25° C. in the range from 100 to 500,000 mPa·s.

8. The curtain air bag according to claim 1, wherein said component (A) exhibits a viscosity at 25° C. in the range from 300 to 100,000 mPa·s.

9. The curtain air bag according to claim 1, wherein said component (A) is at least one of a copolymer of dimethylsiloxane and methylvinylsiloxane with both molecular chain terminals blocked with trimethylsiloxy groups; a methylvinylpolysiloxane with both molecular chain terminals blocked with trimethylsiloxy groups; a copolymer of dimethylsiloxane, methylvinylsiloxane and methylphenylsiloxane with both molecular chain terminals blocked with trimethylsiloxy groups; a dimethylpolysiloxane with both molecular chain terminals blocked with dimethylvinylsiloxy groups; a methylvinylpolysiloxane with both molecular chain terminals blocked with dimethylvinylsiloxy groups; a copolymer of dimethylsiloxane and methylvinylsiloxane with both molecular chain terminals blocked with dimethylvinylsiloxy groups; a copolymer of dimethylsiloxane, methylvinylsiloxane and methylphenylsiloxane with both molecular chain terminals blocked with dimethylvinylsiloxy groups; a dimethylpolysiloxane with both molecular chain terminals blocked with divinylmethylsiloxy groups; a copolymer of dimethylsiloxane and methylvinylsiloxane with both molecular chain terminals blocked with divinylmethylsiloxy groups; a dimethylpolysiloxane with both molecular chain terminals blocked with trivinylsiloxy groups; or a copolymer of dimethylsiloxane and methylvinylsiloxane with both molecular chain terminals blocked with trivinylsiloxy groups.

10. The curtain air bag according to claim 1, wherein said component (D) is at least one selected from the group consisting of chloroplatinic acid, an alcohol-modified chloroplatinic acid, a coordination compound of chloroplatinic acid with an olefin, vinylsiloxane, tetrakis(triphenylphosphine) palladium and chlorotris-(triphenylphosphine)rhodium.

11. The curtain air bag according to claim 10, wherein said component (D) is present in an amount ranging from 1 to 500 ppm.

12. The curtain air bag according to claim 1, wherein said component (F) is at least one selected from the group consisting of:

(i)
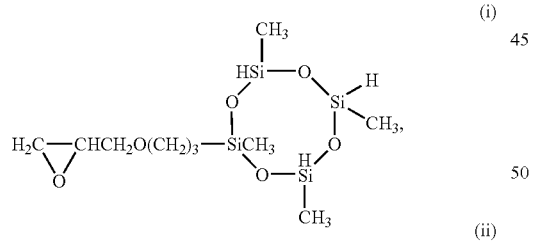

(ii)
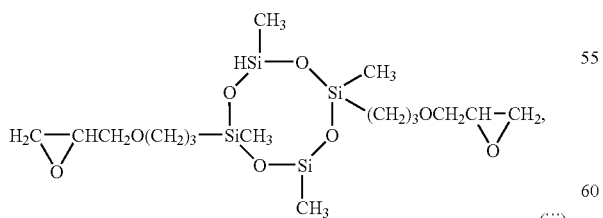

(iii)
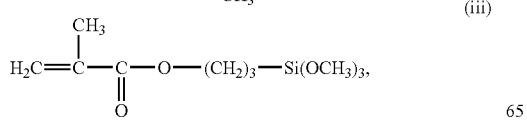

-continued (iv)
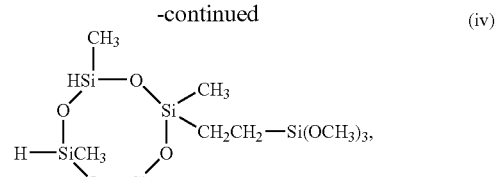

(v)
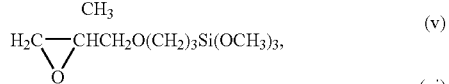

(vi)
$CH_2\!=\!CHSi(OCH_3)_3$, (vii)
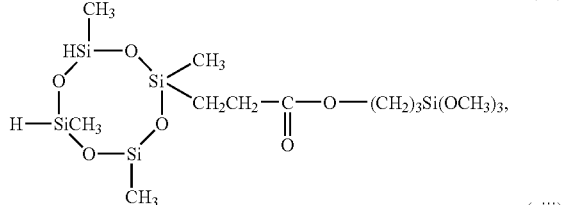

(viii)
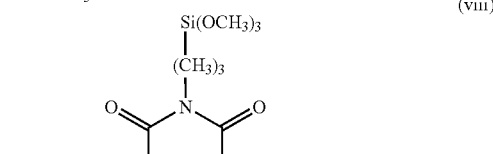

(ix)
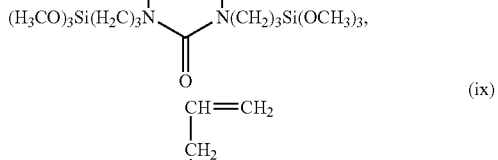

(x)
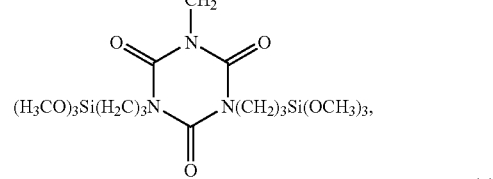

(xi)
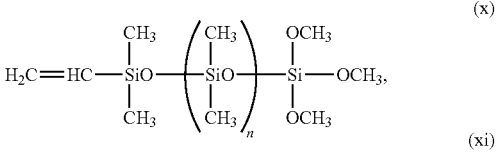

and (xii)
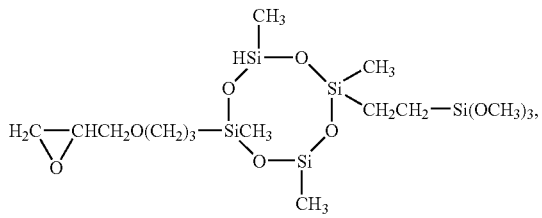

wherein n of formula (x) is an integer ranging from 1 to 98.

13. The curtain air bag according to claim 1, wherein said component (C) is at least one organohydrogenpolysiloxane represented by formula (V).

* * * * *